US006917403B2

United States Patent
Hashimoto et al.

(10) Patent No.: US 6,917,403 B2
(45) Date of Patent: Jul. 12, 2005

(54) REFLECTION TYPE LIQUID CRYSTAL DISPLAY ELEMENT AND LIQUID CRYSTAL DISPLAY UNIT

(75) Inventors: Shunichi Hashimoto, Kanagawa (JP); Tadaaki Isozaki, Kanagawa (JP); Shoko Miyamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 52 days.

(21) Appl. No.: 10/333,549

(22) PCT Filed: Jun. 4, 2002

(86) PCT No.: PCT/JP02/05488

§ 371 (c)(1),
(2), (4) Date: Jun. 12, 2003

(87) PCT Pub. No.: WO02/099522

PCT Pub. Date: Dec. 12, 2002

(65) Prior Publication Data

US 2004/0032551 A1 Feb. 19, 2004

(51) Int. Cl.⁷ .................. G02F 1/1335; G02F 1/1337
(52) U.S. Cl. .................... 349/113; 349/130; 349/62; 349/95
(58) Field of Search .................. 349/113, 130, 349/62, 95

(56) References Cited

U.S. PATENT DOCUMENTS

| | | | | |
|---|---|---|---|---|
| 4,499,521 A | * | 2/1985 | McSweeney et al. | 361/321.5 |
| 5,550,658 A | * | 8/1996 | Yoshihiro | 349/62 |
| 6,081,310 A | * | 6/2000 | Katsuya et al. | 349/113 |
| 6,339,459 B1 | * | 1/2002 | Ichikawa et al. | 349/95 |
| 6,753,839 B2 | * | 6/2004 | Fujita | 345/92 |
| 6,791,640 B1 | * | 9/2004 | Okamoto et al. | 349/113 |

* cited by examiner

Primary Examiner—Huyen Ngo
(74) Attorney, Agent, or Firm—Jay H. Maioli

(57) ABSTRACT

A reflective liquid crystal display device that can prevent a battery effect causing asymmetry in a liquid crystal, display can reduce an offset voltage applied to a driving voltage, and can secure high reliability even during long term driving. A pixel electrode is covered with a metal film, which has a standard electrode potential, with a sign opposite to that of a metallic material constituting the pixel electrode. The metal film prevents a battery effect between the opposing electrodes, unlike conventional devices which do not have the metal film. Thereby, the asymmetry in the liquid crystal display responses can be prevented and the reduction of the offset voltage, which is required for the driving voltage, can be accomplished unlike the conventional ones. A circuit for applying the offset voltage is simplified or unnecessary, and improvement of long term reliability during the driving can be accomplished.

11 Claims, 14 Drawing Sheets

| ELECTRODE MATERIAL | STANDARD ELECTRODE POTENTIAL |
|---|---|
| TITANIUM | −1.75V |
| ALUMINUM | −1.66V |
| TUNGSTEN | −0.12V |
| SILVER | +0.80V |
| PALLADIUM | +0.83V |
| IRIDIUM | +1.00V |
| PLATINUM | +1.20V |
| GOLD | +1.42V |

FIG. 7

| ELECTRODE | ASYMMETRY | OFFSET VOLTAGE |
|---|---|---|
| ONLY ALUMINUM | R(+) > R(−) | −0.6V |
| SILVER 2nm | R(+) = R(−) | 0V |
| SILVER 5nm | R(+) = R(−) | 0V |
| SILVER 20nm | R(+) = R(−) | 0V |
| PALLADIUM 2nm | R(+) = R(−) | 0V |
| PALLADIUM 5nm | R(+) = R(−) | 0V |
| PALLADIUM 20nm | R(+) = R(−) | 0V |
| PLATINUM 2nm | R(+) < R(−) | +0.1V |
| PLATINUM 5nm | R(+) < R(−) | +0.5V |
| PLATINUM 20nm | R(+) < R(−) | +0.5V |
| PALLADIUM-SILVER 5nm (ATOMIC RATIO 50:50) | R(+) = R(−) | 0V |
| PLATINUM-SILVER 5nm (ATOMIC RATIO 50:50) | R(+) = R(−) | 0V |

FIG. 14

REFLECTION TYPE LIQUID CRYSTAL DISPLAY ELEMENT AND LIQUID CRYSTAL DISPLAY UNIT

TECHNICAL FIELD

The present invention relates to a reflective liquid crystal display device having a reflective pixel electrode, and a liquid crystal display using the same such as a reflective liquid crystal projector.

BACKGROUND ART

Liquid crystal display devices have conventionally been used for an image displaying part in various display apparatuses such as a projection display (projector), various portable electric devices, and various information processing terminals, and the like. The liquid crystal display device is called a liquid crystal panel or a liquid crystal cell. The kinds of the liquid crystal display device are broadly classified into a transmission type and a reflective type. The liquid crystal display devices have a structure in which liquid crystal is enclosed between a pixel electrode substrate and an opposite substrate facing the pixel electrode substrate. In the transmission liquid crystal display device, a transparent electrode made of ITO (Indium Tin Oxide) is located on each of the pixel electrode substrate and the opposite substrate.

On the other hand, as fineness, miniaturization and brightness of the liquid crystal projectors are improved in recent years, the reflective liquid crystal display device is remarkably expected to provide miniaturization, high fineness, and high efficiency of light-using as a display device, and actually, it is in practical use. In the reflective liquid crystal display device, a transparent electrode made of ITO is located facing the opposite substrate, and a reflective pixel electrode (hereinafter referred to just as "reflective electrode") is located facing the pixel electrode substrate. The reflective liquid crystal display device used for the liquid crystal projector is generally an active type, and an object having C-MOS (Complementary-Metal Oxide Semiconductor) type semiconductor switching circuit formed on a silicon substrate is used as a pixel electrode substrate. The reflective electrode is located on the silicon driving-devices substrate. The reflective electrode has functions of reflecting light which enters from the side facing the opposite substrate, and of applying voltages to the liquid crystal. As a material of the reflective electrode, metallic materials, which are generally used in LSI (Large Scale Integrated) processes and contain aluminum (Al) as a principal component, are used.

In the reflective liquid crystal display device, voltages are applied to the liquid crystal by the transparent electrode and the pixel electrode which are located respectively on the substrates. At this time, the liquid crystal changes its optical properties depending on a potential difference between the opposing electrodes and modulates incident light. The optical modulation permits gradation display, and the modulated light is used for displaying images.

On the other hand, in the liquid crystal display device, a driving method of reversing polarity to plus or minus for every predetermined period, and applying voltages between the electrodes are generally used in order to prevent ions existing in the liquid crystal from causing burn-in on either of the substrates which is operated. FIG. 18 is a schematic diagram showing a driving voltage using the driving method. As expressed by solid line shown in the diagram, if absolute value of each polar voltage applied between the opposing electrodes is the same at V1, it is supposed that there is no difference between actual voltages applied to the liquid crystal, and that the phenomena such as the burn-in as described above does not occur. However, in fact, particularly in the reflective liquid crystal display device, there is a difference between the actual voltages of plus and minus applied to the liquid crystal. This results from different electrode materials which are used respectively for both substrates in the reflective liquid crystal display device.

That is, in the reflective liquid crystal display device, ITO is generally used as the transparent electrode as described above, and an aluminum metal film containing slight copper or the like is used as the opposed pixel electrode. In this case, both electrodes, which are respectively made of ITO and aluminum, have different standard electrode potentials from each other, so a battery effect is generated in the device using these electrodes which are made of different metals. The standard electrode potential of aluminum is −1.66 V, and combination of the aluminum electrode with the ITO electrode generates a quite high battery effect between these electrodes.

For this reason, even if voltages with both polarities having the same absolute value as expressed by a solid line in FIG. 18 is applied from the outside, the battery effect generates electromotive force, and asymmetric voltages are applied to the liquid crystal. Consequently, the reflectance of the device depends on the polarities of the applied voltages, which causes flicker and stores an internal voltage in the device, resulting in problems such as the burn-in. If an aluminum electrode is used instead of the ITO transparent electrode, that is, if both of the opposing electrodes are similarly made of aluminum, the battery effect is cancelled out, and the above asymmetry does not occur. However, this is not practical because no light passes through the device. Moreover, it is obvious that the problem of the asymmetry does not occur because the electrodes are the same kind in conventional transmission liquid crystal devices which have the opposing electrodes made of ITO. Therefore, the asymmetry is an essential problem in the reflective liquid crystal device.

In order to eliminate the asymmetry in the reflectance of the reflective liquid crystal display device, the driving voltages with both polarities having different absolute values, which are obtained by adding DC offset voltage $\Delta V$ to the driving voltage, should be applied for as expressed by a dashed line in FIG. 18. For example, when aluminum is used as a reflective electrode material and ITO is used for the opposite transparent electrode, an effective voltage difference between both the polarities being applied to the liquid crystal is 1 V or more, and the difference is applied as the offset voltage $\Delta V$. However, if the value of the offset voltage $\Delta V$ is too high, the asymmetry cannot be eliminated completely, and furthermore, the offset voltage $\Delta V$ is gradually changed from an initial setting value during long term driving, and the internal voltage in the device is stored as a result, so the burn-in occurs. This decreases reliability during the long term driving. Moreover, in order to apply the offset voltage $\Delta V$, it is necessary to prepare a circuit for applying it, and an electric circuit system thereof becomes complicated. Therefore, in the reflective liquid crystal display device, the battery effect is not preferable, essentially.

On the other hand, Japanese Patent Laid Open Nos. 9-244068 and 10-54995 teach that metals with a standard electrode potential which is lower enough than that of aluminum, for example, tungsten, (W), titanium (Ti), and titanium nitride (TiN), are used as the reflective electrode material in order to alleviate the above problem of the voltage difference, avoid the battery effect, and reduce the offset voltage.

However, using tungsten, titanium, and titanium nitride as the reflective electrode material, gives insufficient reflectance compared with generally used aluminum, and thus they are unsuitable electrode materials. Therefore, technology developments for achieving reduction of the offset voltage without damaging a light reflective function of the reflective electrode are desired.

The present invention has been achieved in view of the above problems. It is an object of the invention to provide a reflective liquid crystal display device and a liquid crystal display which can prevent the battery effect which is a factor of the asymmetry in liquid crystal responses, reduce the offset voltage applied to the driving voltage, and secure high reliability even during the long term driving.

DISCLOSURE OF THE INVENTION

A reflective liquid crystal display device according to the present invention comprises a pixel electrode substrate which has a reflective pixel electrode made of a metallic material, an opposite substrate which has a transparent electrode being located to face the pixel electrode, and a liquid crystal which a gap between the pixel electrode substrate and the opposite substrate is filled with, wherein a surface of the pixel electrode, the surface facing the transparent electrode, is covered with a metal film made of a material different from that of the pixel electrode, the material of the metal film having a standard electrode potential with a sign opposite to that of the material of the pixel electrode.

A liquid crystal display according to the present invention displays images using light which is modulated by the above reflective liquid crystal display device of the present invention.

In the reflective liquid crystal display device and the liquid crystal display according to the present invention, the battery effect between the electrodes is prevented, because the pixel electrode is covered with the metal film which has the standard electrode potential with the sign opposite to that of the metallic material constituting the pixel electrode. This prevents asymmetry in liquid crystal responses and achieves reduction of an offset voltage required for a driving voltage.

In the reflective liquid crystal display device and the liquid crystal display according to the present invention, it is desirable that a principal component of the metal film is platinum, silver, gold, palladium, iridium, or any alloy of these metallic materials, when aluminum is used as the metallic material of the pixel electrode. This prevents the asymmetry in the liquid crystal responses without damaging a reflective function of the pixel electrode.

BRIEF DESCRIPTION OF THE DRAWINGS

FIG. 7 is a schematic diagram showing standard electrode potentials of various metals.

FIG. 14 is a schematic diagram showing summarized measurement results of an asymmetry state and an offset voltage in each of the materials and their thicknesses.

BEST MODE FOR CARRYING OUT THE INVENTION

Embodiments of the present invention will be described in detail below with reference to accompanying drawings.

[Explanation of a Reflective Liquid Crystal Display Device]

Figure 1:
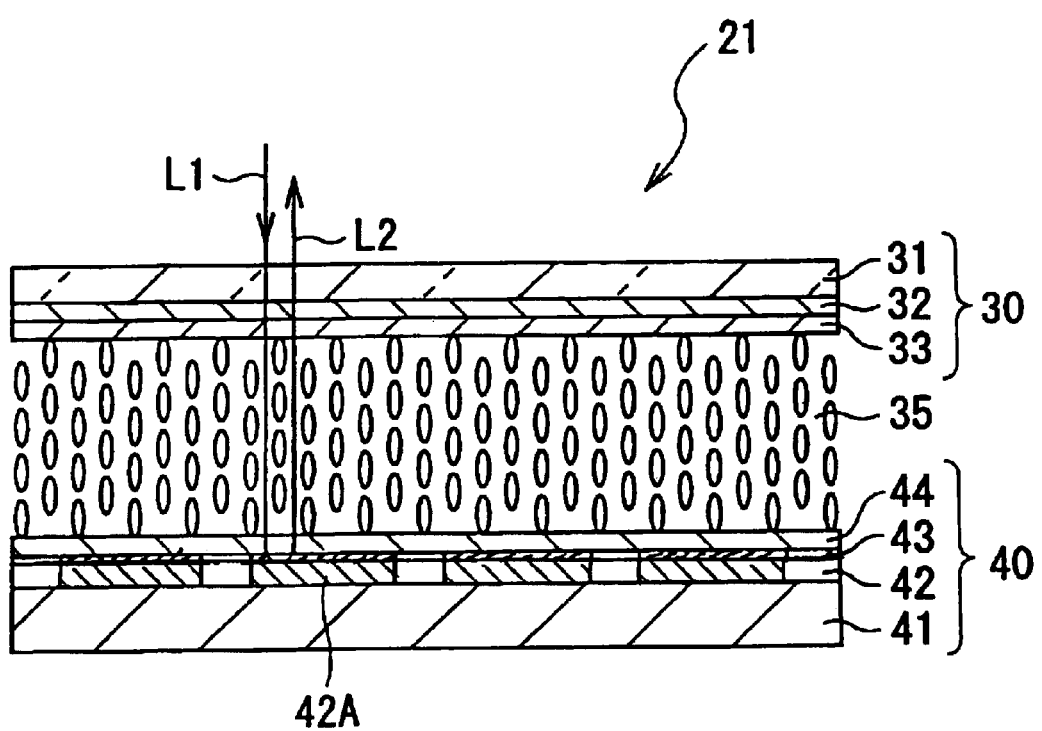
FIG. 1 is a sectional view showing a configuration of a reflective liquid crystal display device according to an embodiment of the invention.

As shown in FIG. 1, a reflective liquid crystal display device 21 according to the embodiment comprises an opposite substrate 30 and a pixel electrode substrate 40 which are located opposite each other, and a liquid crystal layer 35 formed by filling a gap between these substrates is filled with a liquid crystal material.

The liquid crystal material for forming the liquid crystal layer 35 is a vertical alignment type nematic liquid crystal which is generally called vertically aligned liquid crystal, for example. The vertical alignment means a state where molecular orientation in an initial state of the liquid crystal is aligned vertically to each substrate surface. Generally it is called vertically aligned liquid crystal.

The opposite substrate 30 comprises a glass substrate 31, and is composed of at least a transparent electrode layer 32 and an oriented film 33 which are laminated on a surface of the glass substrate 31 facing the liquid crystal layer 35. Rubbing (orientation) treated films of a polyimide organic compound, and oblique evaporated films such as silicon dioxide ($SiO_2$), are used as the oriented film 33, for example. A surface of the oriented film 33 facing the liquid crystal layer 35 is processed by rubbing treatment so that liquid crystal molecules may be aligned into a predetermined state. The transparent electrode layer 32 is constituted by a transparent electrode which has light transmittance and is located on the whole surface. Generally, ITO, which is a solid solution substance of tin oxide ($SnO_2$) and indium oxide ($In_2O_3$), is used as a material of the transparent electrode. A common electric potential (for example, an earth potential) is applied to all pixel areas of the transparent electrode.

The pixel electrode substrate 40 comprises a substrate 41 made of a silicon material, for example, and is composed of at least a reflective electrode layer 42, a metal film 43, and an oriented film 44 which are laminated on a surface of the substrate 41 facing the liquid crystal layer 35. Switching elements (not shown) for applying voltages selectively to pixel electrodes 42A of the reflective electrode layer 42 are located on the substrate 41.

Like the oriented film 33 of the opposite substrate 30, polyimide organic compound films and oblique evaporated films such as silicon dioxide are used as the oriented film 44, and a surface thereof is processed by the rubbing treatment.

The reflective electrode layer 42 is composed of a plurality of the reflective pixel electrodes 42A made of a metallic material which are arranged in a matrix shape. The thickness of the reflective electrode layer 42 is 50 nm–200 nm. Aluminum which has high reflectance in the visible region is generally used as a metallic material of the pixel electrodes 42A. More particularly, aluminum metal films containing several wt % or less of copper or silicon which are used for wirings in LSI processes are generally used. Others such as platinum (Pt), silver (Ag), gold (Au), tungsten (W), and titanium (Ti) can be also used as the pixel electrodes 42A.

A driving voltage is applied to the pixel electrodes 42A by the switching elements which are located on the substrate 41 and which are not illustrated. The switching elements are provided respectively corresponding to the pixel electrodes 42A, and are composed of a C-MOS type field effect transistor (FET), for example.

The metal film 43 is formed so that surfaces, which face the transparent electrode layer 32, of the pixel electrodes 42A in the reflective electrode layer 42 may be overcoated (covered) on the whole. The thickness of the metal film 43 is not less than 1 nm and below 100 nm. A dissimilar metallic material, which has a standard electrode potential with a sign opposite to that of a metallic material constituting the pixel electrodes 42A, is used as the metal film 43. Specifically, silver, palladium (Pd), platinum, iridium (Ir), gold, and any alloy of these metallic materials can be used. Elemental substances of these metallic materials, and materials, which are obtained by adding or mixing one or more of these metallic materials as a principal component to other elements, may be used as the metal film 43. As described above, the pixel electrodes 42A are overcoated with the metal film 43, which is the important feature of the reflective liquid crystal display device 21.

Next, actions and operations of the reflective liquid crystal display device 21 which has the configuration as described above will be described.

In the reflective liquid crystal display device 21, incident light L1 enters first the opposite substrate 30, passes through the liquid crystal layer 35, and is reflected with a reflective function of the pixel electrodes 42A which are located in the reflective electrode layer 42. The light L1, which is reflected on the reflective electrode layer 42, passes through the liquid crystal layer 35 and the opposite substrate 30 in a direction opposite to the incident direction, and exits. At this time, optical characteristics of the liquid crystal layer 35 changes corresponding to a potential difference between the opposing electrodes, and this modulates the light L1 passing through the liquid crystal layer 35. This optical modulation permits gradation display and the modulated light L2 is used for displaying images.

On the other hand, the driving voltage which reverses ± of its polarity for every predetermined period is applied to the pixel electrodes 42A of the reflective electrode layer 42, for example. At this time, in conventional reflective liquid crystal display devices, different electrode materials are used as the opposing electrodes, so corresponding to the polarity, an internal voltage is generated between the electrodes due to the so-called battery effect, and asymmetry is generated in responses of the liquid crystal. For this reason, a direct voltage for compensating it should be separately applied as an offset voltage for the driving. If the offset voltage is increased, it is difficult to completely compensate it, and furthermore, the value thereof is varied or changed during long term driving, which causes problems such as the burn-in.

On the other hand, in the reflective liquid crystal display device 21, the pixel electrodes 42A are overcoated with the metal film 43, which has the standard electrode potential with the sign opposite to that of the metallic material constituting the pixel electrodes 42A, which prevents the battery effect from being generated between the opposing electrodes. Specifically, for example, when aluminum electrodes are used as the pixel electrodes 42A, the aluminum electrodes are covered with a metal having a standard electrode potential with a sign opposite to that of aluminum, such as silver, palladium, platinum, iridium, or gold, or any alloy film of these metallic materials as the metal film 43 as shown in FIG. 7. This prevents significantly the battery effect generated between the transparent electrode layers 32 made of ITO and the reflective electrode layer, for example. Thereby, in the reflective liquid crystal display device 21, the asymmetry in the liquid crystal responses is prevented, and the offset voltage required for the driving voltage is reduced or unnecessary, and furthermore, high reliability is obtained during the long term driving.

Here, the reason why the overcoating with the metal film 43 prevents the battery effect will be described below. As shown in FIG. 7, the standard electrode potential of aluminum is as high as −1.66 V and its sign is minus. On the other hand, all of the standard electrode potentials of silver, palladium, platinum, and the like have plus sign opposite to that of aluminum and exhibit approximately 1 V. Moreover, these alloy films also exhibit a plus value of approximately 1 V. The standard electrode potential of the ITO transparent electrode, which constitutes the transparent electrode layer 32, is supposed to be approximately +1V, because the battery effect occurs when there is a potential difference between the opposing electrodes. That is, in the embodiment, the metallic material, which the pixel electrodes 42A are overcoated with, has originally the electric potential of approximately +1V which is expected to be almost the same as the electric potential of the ITO transparent electrode, and thus it is thought that no potential difference occurs between the opposing electrodes, so no battery effect is generated.

Actually, in results of measuring electromotive forces of the reflective liquid crystal display device which is produced to have the overcoating of the metal film 43, electromotive force resulting from the potential difference was not substantially observed. This is needless to say that electromotive forces resulting from the battery effect are observed in the conventional devices which do not have the overcoating of the metal film 43.

As described above, according to the reflective liquid crystal display device 21 of the embodiment, the pixel electrodes 42A are covered with the metal film 43, which has the standard electrode potential with the sign opposite to that of the metallic material constituting the pixel electrodes 42A, so that the battery effect between the opposing electrodes can be prevented unlike the conventional devices which do not have the covering of the metal film 43. Thereby, the asymmetry in the liquid crystal responses can be prevented, so the reduction of the offset voltage applied to the driving voltage can be accomplished. Therefore, applying the offset voltage becomes unnecessary, or the change of the offset voltage can be decreased during the long term driving, and as a result, high reliability can be secured during the long term driving. Moreover, a circuit for applying the offset voltage is simplified or unnecessary.

[Explanation of a Liquid Crystal Display]

Next, an example of a liquid crystal display using the reflective liquid crystal display device 21 will be explained. Here, as shown in FIG. 17, an example of a reflective liquid crystal projector using the reflective liquid crystal display device 21 as a light valve will be explained.

Figure 17:
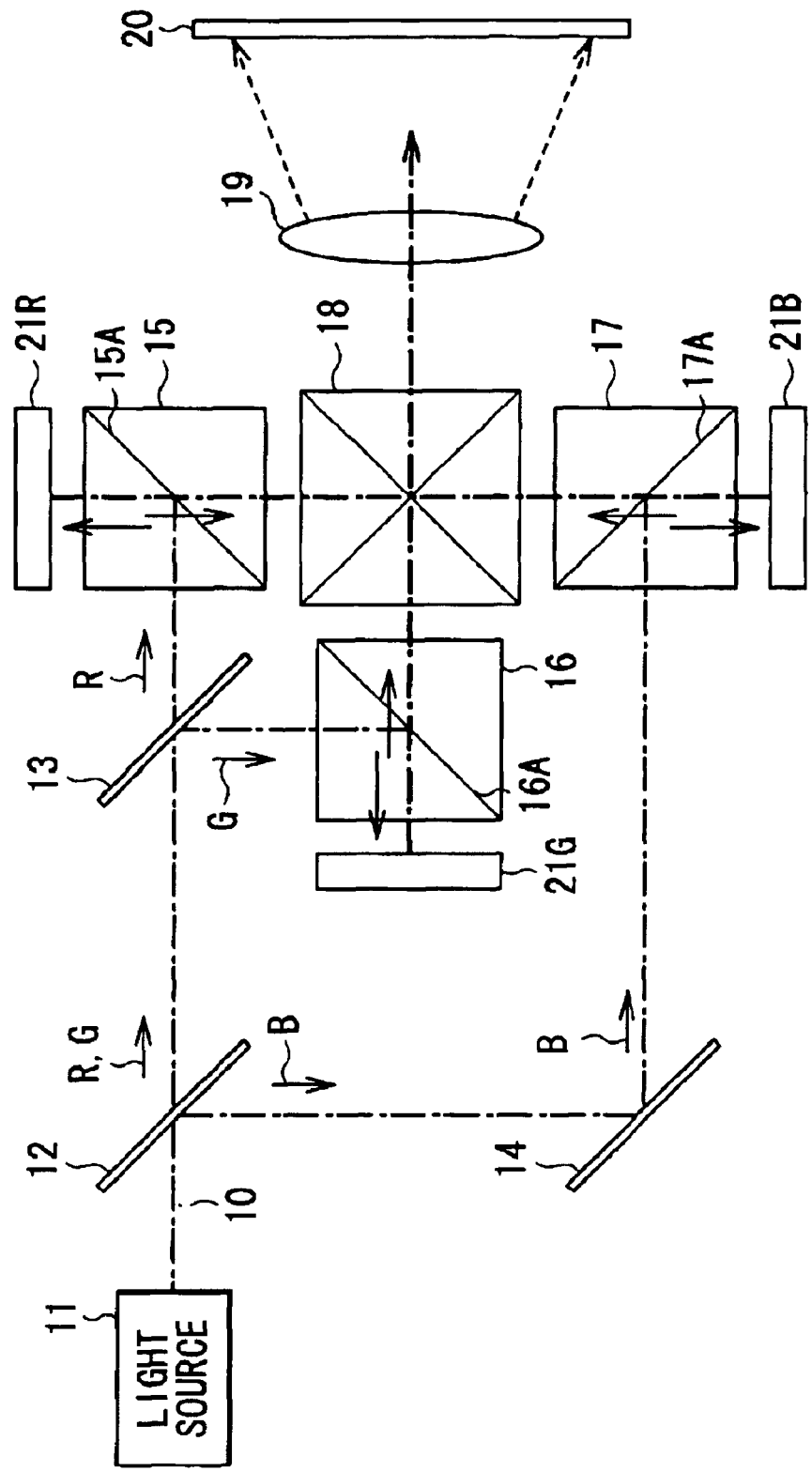
FIG. 17 is a block diagram showing an example of a liquid crystal display which is constituted using the reflective liquid crystal display device shown in FIG. 1.

The reflective liquid crystal projector shown in FIG. 17 is a so-called 3 panel type one for displaying color images using three liquid crystal light valves 21R, 21B, and 21G respectively for colors of red, blue, and green. The reflective liquid crystal projector comprises a light source 11, dichroic mirrors 12 and 13, and a total reflection mirror 14 which are placed along an optical axis 10. Furthermore, the reflective liquid crystal projector comprises polarizing beam splitters 15, 16, and 17, a combining prism 18, a projector lens 19, and a screen 20.

The light source 11 emits white light containing red light (R), blue light (G), and green light (B) which are needed for displaying the color images, and is composed of a halogen lamp, a metal halide lamp, or a xenon lamp, for example.

The dichroic mirror 12 has a function of separating light, which comes from the light source 11, into blue light and light containing other colors. The dichroic mirror 13 has a function of separating light, which passes through the dichroic mirror 12, into red light and green light. The total reflection mirror 14 reflects the blue light separated by the dichroic mirror 12 toward the polarizing beam splitter 17.

The polarizing beam splitters 15, 16, and 17 are located along optical paths of red light, green light, and blue light, respectively. These polarizing beam splitters 15, 16, and 17 have surfaces for separating polarized light 15A, 16A, and 17A, respectively, and have a function of separating the incident color light into two polarized light components which are orthogonal mutually in these surfaces for separating polarized light 15A, 16A, and 17A. The surfaces for separating polarized light 15A, 16A, and 17A reflect one polarized light component (for example, an S-polarized light component), and transmit the other polarized light component (for example, a P-polarized light component).

The liquid crystal light valves 21R, 21G, and 21B are composed of the reflective liquid crystal display device 21. These liquid crystal light valves 21R, 21G, and 21B receive color lights of a predetermined polarized light component (for example, the S-polarized light component) separated by the surfaces for separating polarized light 15A, 16A, and 17A of the polarizing beam splitters 15, 16, and 17, respectively. The liquid crystal light valves 21R, 21G, and 21B have a function of being driven corresponding to the driving voltage which is applied based on image signals, modulating the incident light, and reflecting the modulated incident light toward the polarizing beam splitters 15, 16, and 17.

The combining prism 18 has a function of combining the color lights of the predetermined polarized light components (for example, the P-polarized light component) which are emitted from the liquid crystal light valves 21R, 21G, and 21B, and pass through the polarizing beam splitters 15, 16, and 17. The projector lens 19 has a function of projecting the combined light, which is emitted from the combining prism 18, toward the screen 20.

In the reflective liquid crystal projector which is composed as described above, the white light emitted from the light source 11 is first separated into the blue light and the light containing other colors (the red light and the green light) with the function of the dichroic mirror 12. The blue light is reflected towards the polarizing beam splitter 17 with the function of the total reflection mirror 14. On the other hand, the red light and the green light are further separated into the red light and the green light with the function of the dichroic mirror 13. The separated red light and green light enter the polarizing beam splitters 15 and 16, respectively.

Each of the polarizing beam splitters 15, 16, and 17 separates the incident color light into the two polarized light components, which are orthogonal each other, in the surfaces for separating polarized light 15A, 16A, and 17A. At this time, the surfaces for separating polarized light 15A, 16A, and 17A reflect one of the polarized light components (for example, the S-polarized light component) toward the liquid crystal light valves 21R, 21G, and 21B.

The liquid crystal light valves 21R, 21G, and 21B are driven corresponding to the driving voltage, which is applied based on the image signals, to modulate the color light of the incident predetermined polarized light component per pixel. Here, the liquid crystal light valves 21R, 21G, and 21B are composed of the above reflective liquid crystal display device 21, so the offset voltage is reduced and they are driven by the driving voltage having more excellent symmetry compared with the conventional types.

The liquid crystal light valves 21R, 21G, and 21B reflect the modulated color light to the polarizing beam splitters 15, 16, and 17. The polarizing beam splitters 15, 16, and 17 transmit only the predetermined polarized light component (for example, the P-polarized light component) of the reflected light (the modulated light) which is from the liquid crystal light valves 21R, 21G, and 21B, and emit the component towards the combining prism 18. The combining prism 18 combines the color lights of the predetermined polarized light components passing through the polarizing beam splitters 15, 16, and 17, and emits the combined light towards the projector lens 19. The projector lens 19 projects the combined light, which is emitted from the combining prism 18, toward the screen 20. Thereby, images corresponding to the light modulated by the liquid crystal light valves 21R, 21G, and 21B are projected on the screen 20, which accomplished desired image display.

As described above, according to the reflective liquid crystal projector of the embodiment, the reflective liquid crystal display device 21, in which the pixel electrodes 42A are overcoated with the metal film 43, is used as the liquid crystal light valves 21R, 21G, and 21B, so the offset voltage, which has conventionally been needed for the driving voltage in the liquid crystal light valves 21R, 21G, and 21B, is reduced or unnecessary. Thereby, the circuit for applying the offset voltage is simplified or unnecessary, which allows the driving circuit of the liquid crystal light valves 21R, 21G, and 21B to be simplified.

Next, concrete characteristics of the reflective liquid crystal display device 21 will be shown as Examples. Prior to describing Examples, characteristics of the conventional reflective liquid crystal display devices which do not have the metal film 43 will be first shown as Comparative

EXAMPLES

Comparative Example

Devices were prepared as a reflective liquid crystal display device (a liquid crystal cell) for evaluation which is used as Comparative Example, using ITO as the transparent electrode material in the opposite substrate, and using various metal electrode materials (aluminum, platinum, and the like) as the pixel electrode in the pixel electrode substrate. These devices for evaluation were produced as follows. First, a glass substrate having the ITO transparent electrode thereon for using as the opposite substrate, and a silicon substrate having the electrode thereon which is made of one of the various electrodes for using as the pixel electrode substrate were cleaned and introduced into an evaporation apparatus, and a $SiO_2$ film as the oriented film was formed with oblique evaporation in an evaporation angle range of 45° to 55°. The thickness of the oriented film was 50 nm. The pretilt angle of liquid crystal was controlled to become about 3°. Then, a suitable number of glass beads with a diameter of 2 $\mu$m were dispersed between the substrates with the oriented films formed to bond both of the substrates, and a vertical liquid crystal material with negative dielectric anisotropy $\Delta\epsilon$ was injected thereinto to produce a reflective liquid crystal cell.

Figure 18:
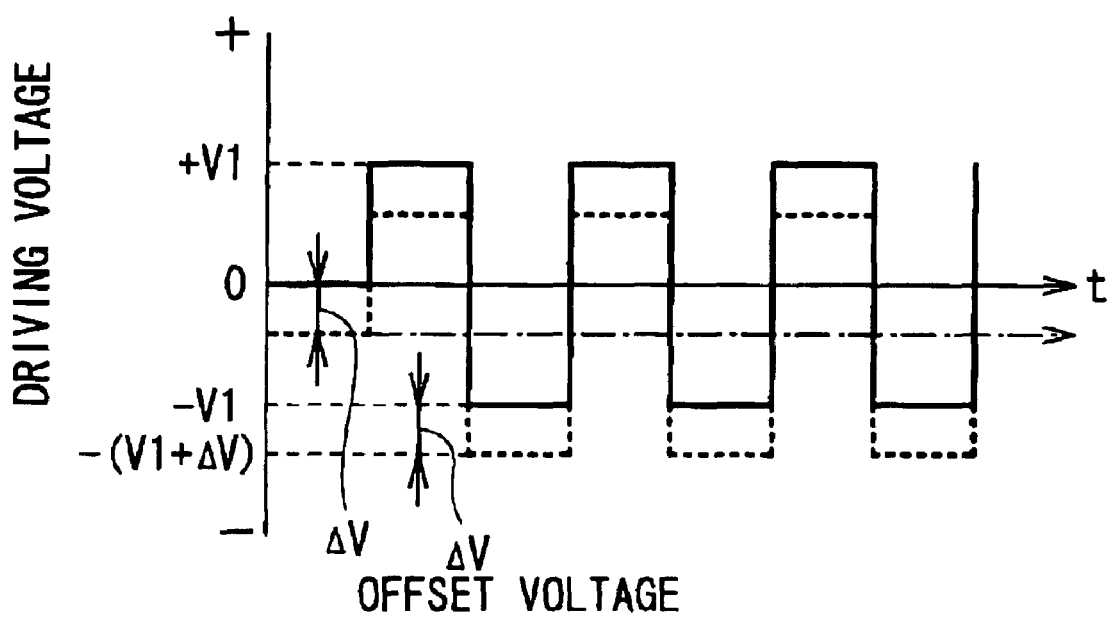
FIG. 18 is a wave form chart for explaining an example of a driving method for a liquid crystal display device.

Change in transmittance of the liquid crystal in each of the devices produced in such a way, was measured in a cross nicol state with a polarizing microscope, when a square wave voltage of 60 Hz as shown in FIG. 18 was applied as the driving voltage between the ITO transparent electrode and the pixel electrode (in fact, the reflectance of the device was measured, because the devices were the reflective type, and this measurement is equivalent to measuring the transmittance of the liquid crystal). A standard Al reflective film was used as a reference. The measurement was performed using a wavelength of 520 nm at room temperature.

Hereinafter, R(+) and R(−) express reflectances of the device when applying the plus and minus voltages to the side of the pixel electrode, respectively. First, all of the metallic materials were compared in terms of change of the reflectance R to the voltage V applied to the pixel electrode (which is called a V-T characteristic, hereinafter) (FIGS. 2 to 5). In the figures showing curves (V-T curves) of the V-T characteristic, the horizontal axis represents applied voltages (V) and the vertical axis represents reflectance (%). In addition, in FIGS. 3 to 5, the horizontal axis represents absolute values of the applied voltage to simplify the figure. Moreover, in the figures showing the V-T curves, the measured values of the reflectance R(−) obtained when using the minus applied voltage were plotted and indicated by circles, and the measured values of the reflectance R(+) obtained when using the plus applied voltage were plotted and indicated by black circles.

Comparative Example 1

Figure 2:
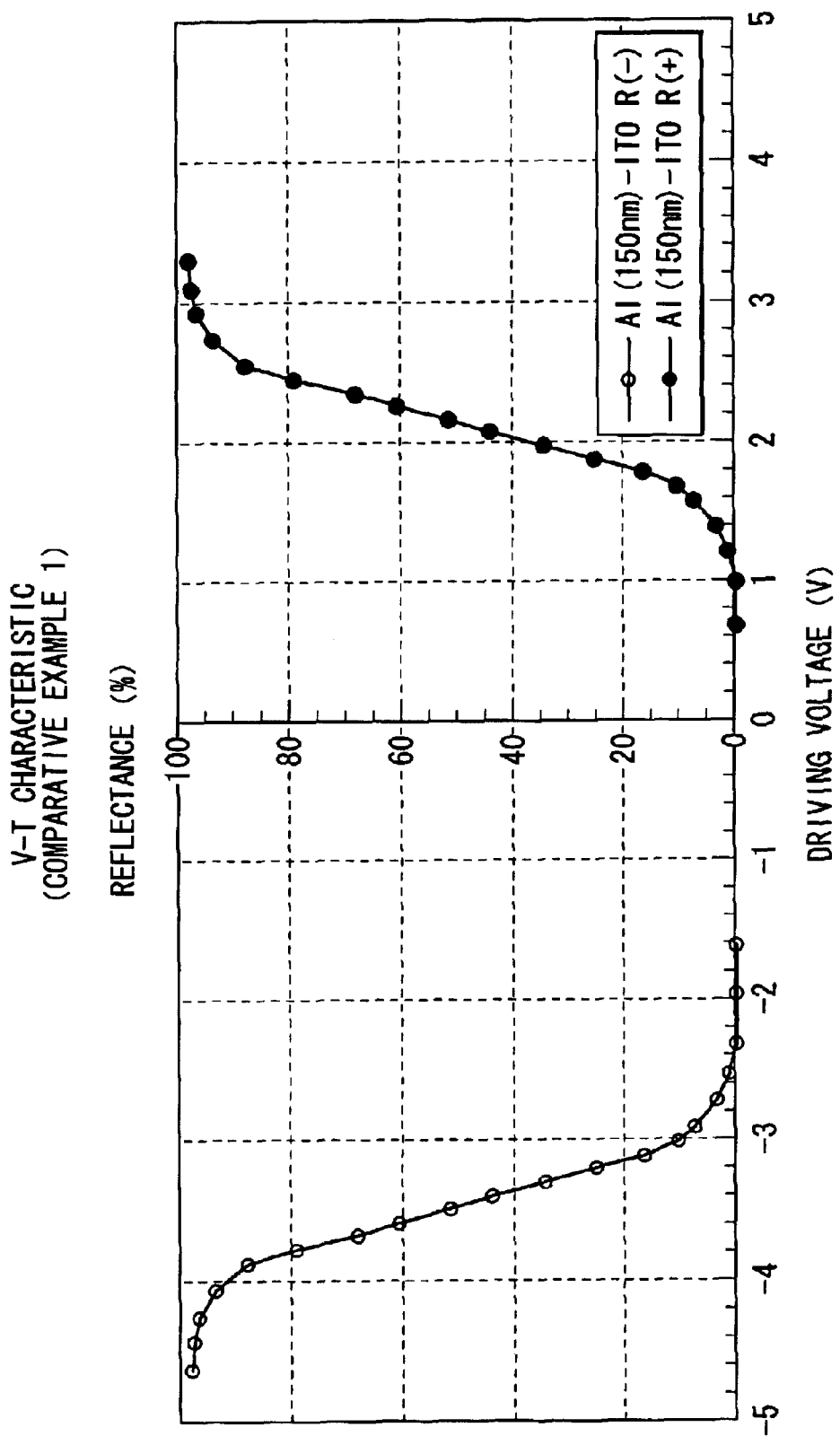
FIG. 2 is a characteristic view showing a relation between an applied voltage and reflectance when aluminum is used as a metallic material of a pixel electrode (Comparative Example 1).

FIG. 2 shows the V-T characteristic when using aluminum (150 nm in thickness) as the metallic material of the pixel electrode. As shown in FIG. 2, the V-T curves when applying both polarities of the voltages were asymmetric, and the V-T curve of the reflectance when applying the plus voltage R(+) was shifted to a voltage side lower than the V-T curve of the reflectance in the case of the minus R(−). That is, comparing the reflectance at the same magnitude of the applied voltages reveals that a characteristic of R(+)>R(−) was always obtained.

The liquid crystal was asymmetrically driven in this way in spite of applying the same magnitude of the plus and minus external voltages to the liquid crystal cell, which means that no symmetrical voltage was applied to the liquid crystal. This results from the direct current battery effect generated between the dissimilar electrodes of the ITO transparent electrode and the aluminum electrode. If the driving is continued in this state, the internal voltage is stored in the liquid crystal cell, and this causes the burn-in. Therefore, for practical use, the offset voltage $\Delta V$ equal to the shifted voltage (voltage corresponding to the battery effect) should be applied so as to obtain R(+)=R(−). $\Delta V$ in Comparative Example 1 is $\Delta V$=0.6 V and only $\Delta V$ of the direct current offset voltage is applied to the signal voltage for the driving as shown in FIG. 18. However, the above burn-in phenomenon may occur during the long term driving, unless the value of the $\Delta V$ is correctly set and continuously applied, and furthermore, the $\Delta V$ itself may be changed due to the long term driving, change of environmental temperatures, and the like, so reducing or eliminating the $\Delta V$ is essentially indispensable for practical use.

In addition, the above phenomenon occurred similarly, when a polyimide film was used as the oriented film, and when other nematic liquid crystal material except for the vertically aligned liquid crystal was used.

Comparative Example 2

Figure 3:
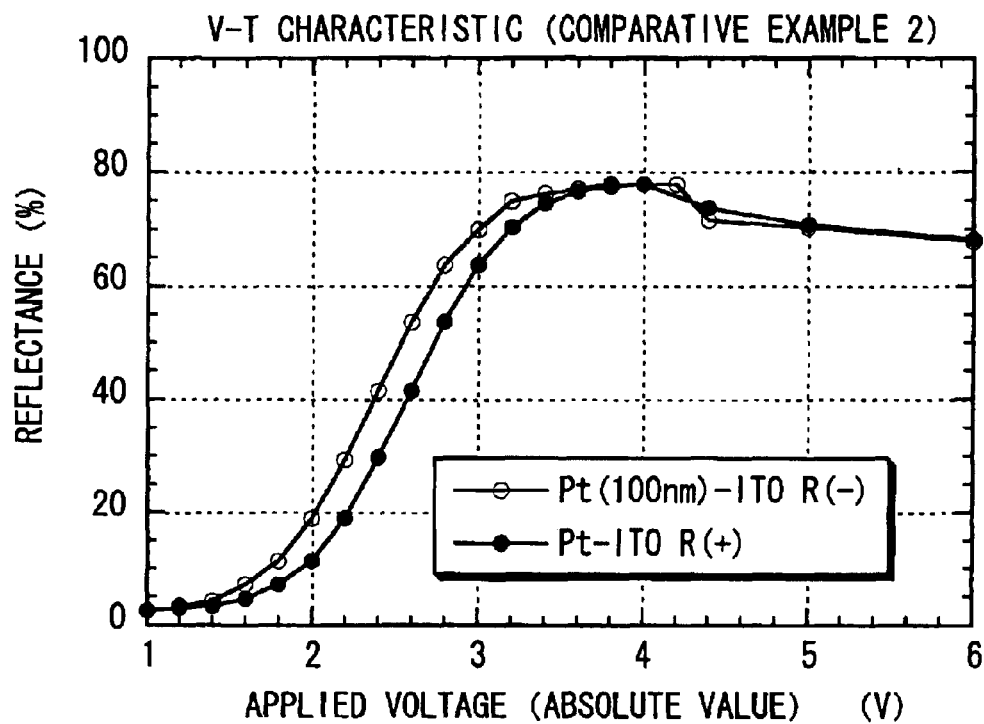
FIG. 3 is a characteristic view showing a relation between an applied voltage and reflectance when platinum is used as the metallic material of the pixel electrode (Comparative Example 2).

FIG. 3 shows the V-T characteristic when using platinum (100 nm in thickness) as the metallic material of the pixel electrode. In the comparative example, comparing with the reflectance at the same magnitude of the applied voltages, a characteristic of R(+)<R(−) was obtained unlike Comparative Example 1.

Comparative Example 3

Figure 4:
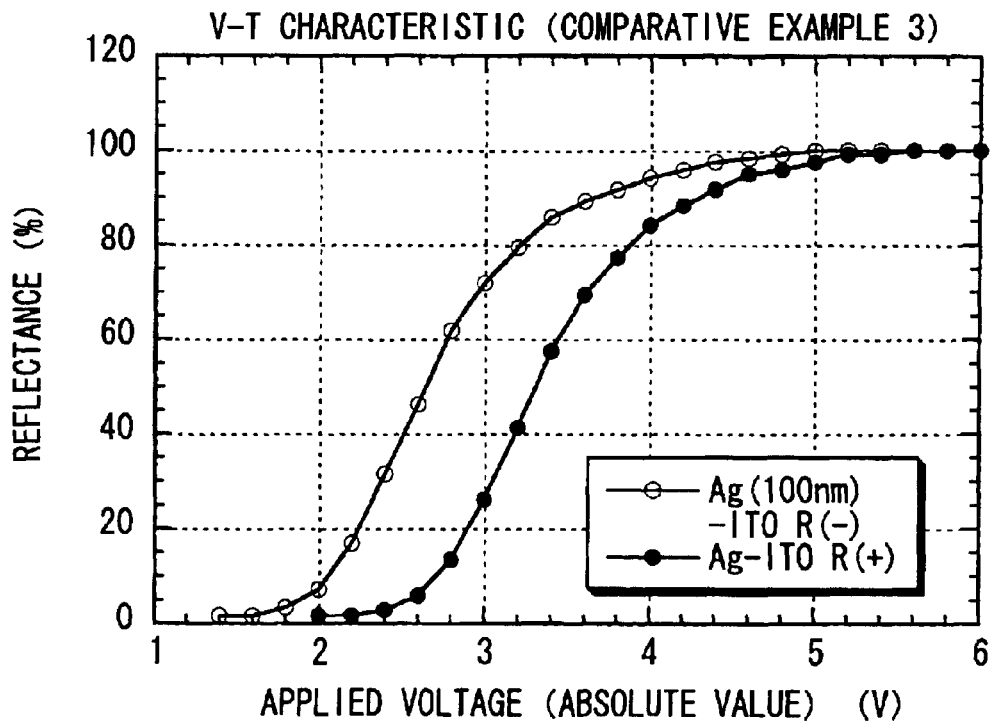
FIG. 4 is a characteristic view showing a relation between an applied voltage and reflectance when silver is used as the metallic material of the pixel electrode (Comparative Example 3).

FIG. 4 shows the V-T characteristic when using silver (100 nm in thickness) as the metallic material of the pixel electrode. In the comparative example, comparing the reflectance at the same magnitude of the applied voltages, a characteristic of R(+)<R(−) was always obtained like Comparative Example 2.

Comparative Example 4

Figure 5:
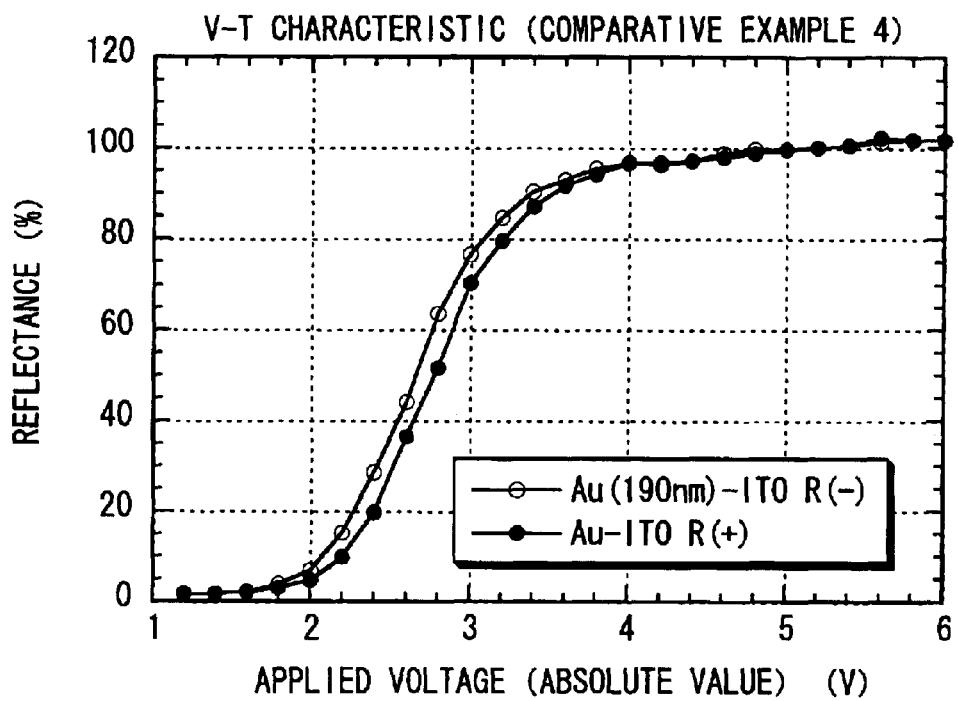
FIG. 5 is a characteristic view showing a relation between an applied voltage and reflectance when gold is used as the metallic material of the pixel electrode (Comparative Example 4).

FIG. 5 shows the V-T characteristic when using gold (190 nm in thickness) as the metallic material of the pixel electrode. In the comparative example, comparing the reflectance at the same magnitude of the applied voltages, a characteristic of R(+)<R(−) was obtained like Comparative Example 2.

Figure 6:
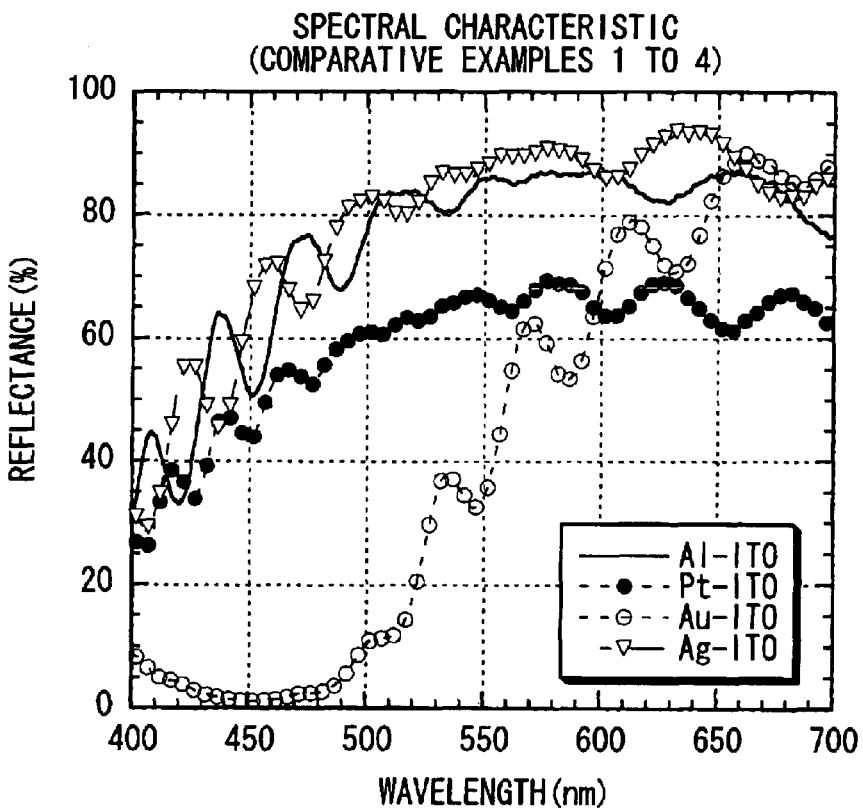
FIG. 6 is a characteristic view showing a spectral property of the reflectance in the devices of Comparative Examples.

FIG. 6 shows a spectral characteristic of the reflectance when a 60 Hz square wave was applied as the driving voltage to the devices of Comparative Examples 1 to 4. In FIG. 6, the horizontal axis represents wavelength (nm) and the vertical axis represents reflectance (%). In the figure, a plotted curve with black circles represents measurement results when platinum (100 nm in thickness) is used as the metallic material of the pixel electrode (Comparative Example 2), and plotted cures with inverted triangles and circles represent measurement results respectively when using silver (100 nm in thickness) (Comparative Example 3), and gold (190 nm in thickness) (Comparative Example 4). Moreover, a solid line with no plotting point represents measurement results when using aluminum (150 nm in thickness) (Comparative Example 1). The measurement was performed with an intensified multichannel spectrophotometer IMUC7000 manufactured by Otsuka Electronics Co., Ltd. using a standard aluminum reflective film as a reference. As can be seen from the results of FIG. 6, the reflectance on the short wavelength side was decreased remarkably, especially when gold was used as the pixel electrode. Therefore, comparison of only the V-T curves reveals that the utilization of gold as the pixel electrode (FIG. 5) provided substantially no asymmetry and an almost ideal state, but the reflective function was insufficiently obtained as shown in the spectral characteristic of FIG. 6, so gold is a practically unsuitable material.

On the other hand, the relation between the reflectances R(+) and R(−) in Comparative Example 1 is opposite to those of Comparative Examples 2–4 in the above results. This results from the fact that the sign of the standard electrode potential of aluminum (Comparative Example 1) is opposite to ones of platinum, silver and gold (Comparative Examples 2 to 4) as shown in FIG. 7. Therefore, the pixel electrodes are overcoated with the metal film 43 in consideration of the relation between the reflectances R(+) and R(−) which is generated by the difference of the signs of the standard electrode potentials. This can improve the asymmetry in the reflectances R(+) and R(−) as shown below in Examples.

Example 1

Cases of Using a Metallic Elemental Substance Material

In the example, aluminum (150 nm in thickness) was used as the metallic material of the pixel electrodes 42A, various metallic elemental substance materials having a positive value of the standard electrode potential which is opposite to that of aluminum were used as the metal film 43 to overcoat the aluminum electrodes with, and the V-T characteristic was examined. The overcoating was formed with the evaporation or sputtering deposition. ITO was used as the transparent electrode material in the opposite substrate 30 like the above comparative examples. Production of the devices for evaluation was the same as those of Comparative Examples except for the overcoating process using the metal film 43. Moreover, measurement conditions were the same as those of Comparative Examples, and change of the reflectance R of the liquid crystal when applying a square wave voltage of 60 Hz was measured. Like Comparative Examples, the horizontal axis in V-T curves represents absolute values of the applied voltages for simplification.

Example 1-1

Figure 8:
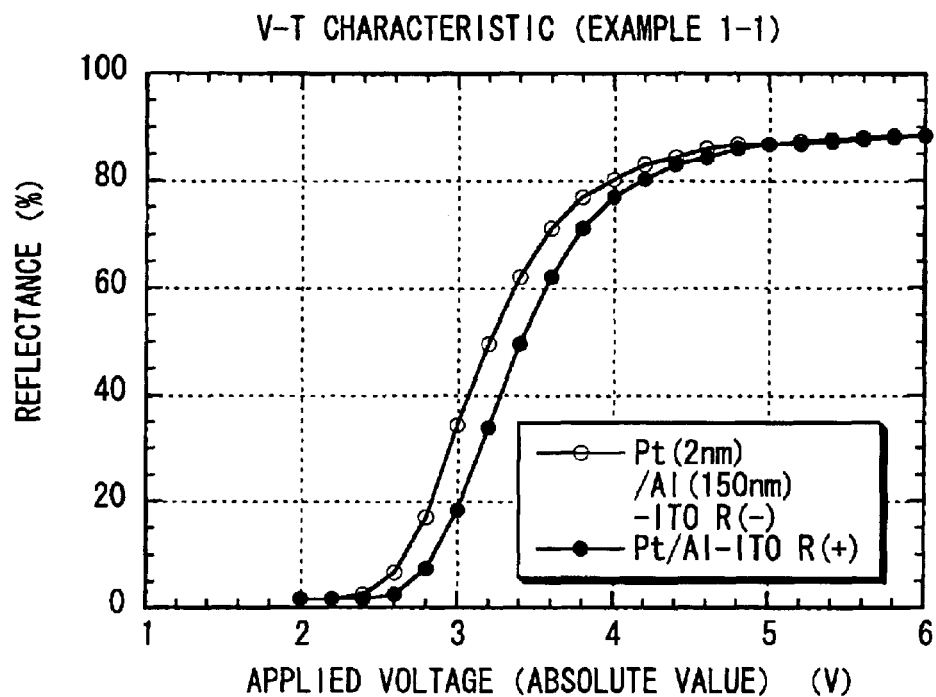
FIG. 8 is a characteristic view showing a relation between an applied voltage and reflectance when using platinum as a metal film for overcoating (Example 1-1).

FIG. 8 shows the V-T characteristic when the aluminum pixel electrodes are overcoated with platinum of 2 nm in thickness as the metal film 43. FIG. 8 exhibits R(+)<R(−) and little asymmetry in the both polarities of the reflectances R(+) and R(−) was observed because of only 2 nm overcoating. The offset voltage was 0.5 V and decreased more dramatically than ever before.

Example 1-2

Figure 9:
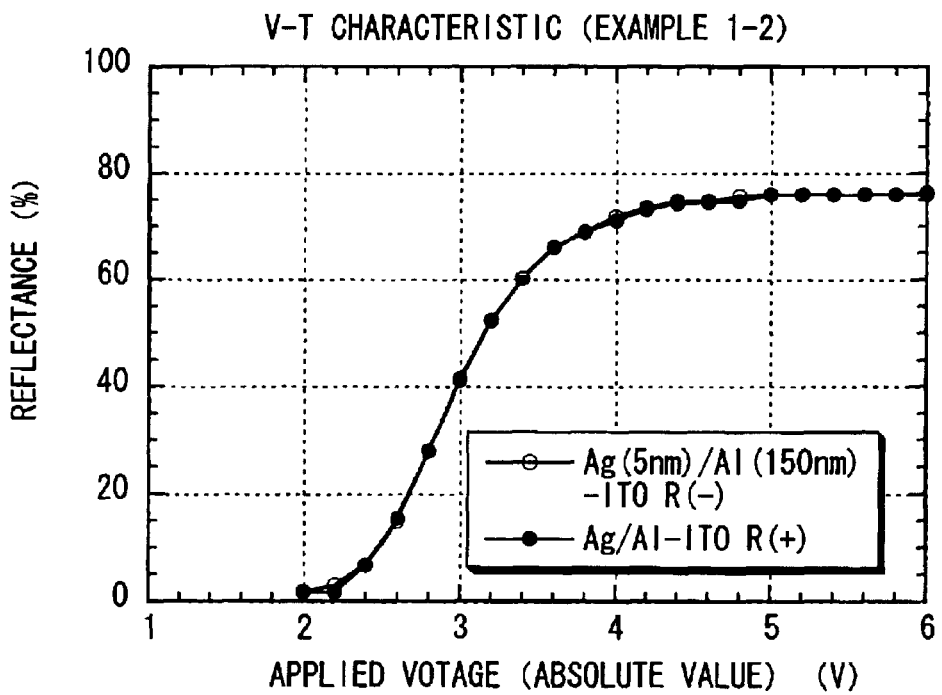
FIG. 9 is a characteristic view showing a relation between an applied voltage and reflectance when using silver as the metal film for overcoating (Example 1-2).

FIG. 9 shows the V-T characteristic when the aluminum pixel electrodes are overcoated with silver of 5 nm in thickness as the metal film 43. In the example, R(+)=R(−) was observed and the asymmetry in both polarities of the reflectances R(+) and R(−) was not observed at all. No offset voltage was observed.

Example 1-3

Figure 10:
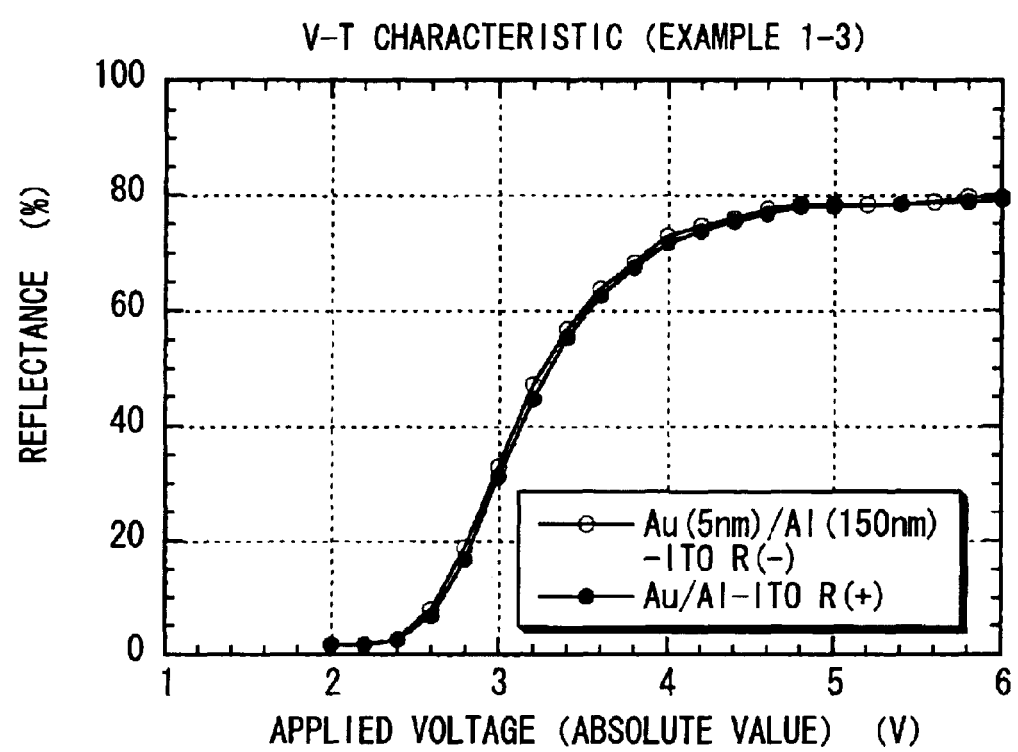
FIG. 10 is a characteristic view showing a relation between an applied voltage and reflectance when using gold as the metal film for overcoating (Example 1-3).

FIG. 10 shows the V-T characteristic when the aluminum pixel electrodes are overcoated with gold of 5 nm in thickness as the metal film 43. In the example, R(+)=R(−) was observed and the asymmetry in both polarities of the reflectances R(+) and R(−) was not observed substantially. Little offset voltage was observed.

Example 1-4

Figure 11:
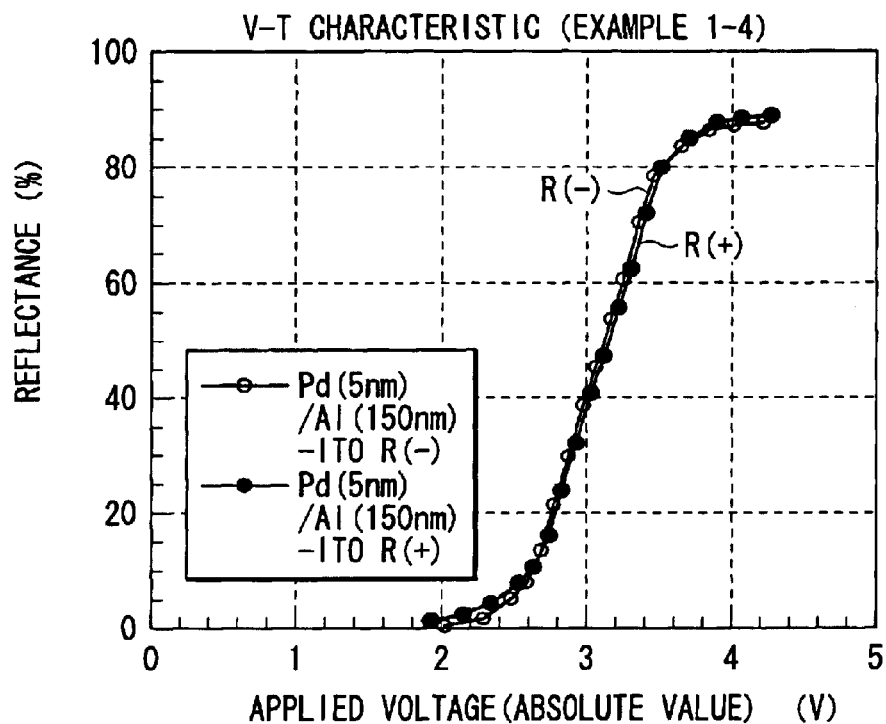
FIG. 11 is a characteristic view showing a relation between an applied voltage and reflectance when using palladium as the metal film for overcoating (Example 1-4).

FIG. 11 shows the V-T characteristic when the aluminum pixel electrodes are overcoated with palladium of 5 nm in thickness as the metal film 43. In the example, R(+)=R(−) was observed and the asymmetry in both polarities of the reflectances R(+) and R(−) was not observed at all. No offset voltage was observed.

The results of Examples 1-1 to 1-4 reveal that when the aluminum electrodes are overcoated with platinum, silver, gold, or palladium, which has a positive value of the standard electrode potential opposite to that of aluminum, no battery effect was observed, or the value thereof was decreased, and the asymmetry of the V-T curve, i.e., the asymmetry of the liquid crystal responses, was prevented considerably, and this decreases the offset voltage to zero or a very small value, unlike each of Comparative Examples. Moreover, in the devices of these examples, even when the long term driving was performed, problems such as the burn-in were not observed at all. These effects were similarly observed, when they were overcoated with other metallic materials of simple substance such as iridium which had a positive value of the standard electrode potential, which is not illustrated.

Example 2

Cases of Using an Alloy Material

Next, aluminum (150 nm in thickness) was used as the metallic material of the pixel electrodes 42A, various alloy materials having a positive value of the standard electrode potential which is opposite to that of aluminum were used as the metal film 43 to overcoat the aluminum electrode with, and the V-T characteristic was examined. Production of devices for evaluation and measurement conditions were the same as those of Example 1.

Figure 12:
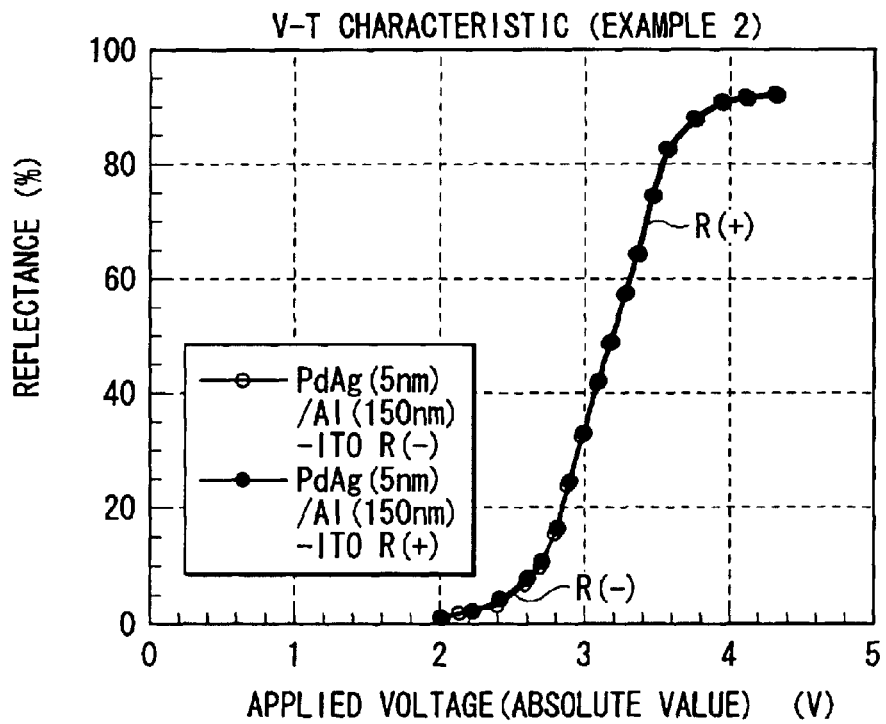
FIG. 12 is a characteristic view showing a relation between an applied voltage and reflectance when using a palladium-silver alloy film as the metal film for overcoating (Example 2).

First, a liquid crystal cell, in which aluminum pixel electrodes with a thickness of 5 nm were overcoated with a palladium-silver alloy film with an atomic ratio of silver and palladium of 50:50 as the dissimilar-metal film 43, was produced and the V-T characteristic was measured. Results are shown in FIG. 12. Moreover, a liquid crystal cell, in which they were overcoated with a platinum-silver alloy film with an atomic ratio of platinum and silver of 50:50, was similarly produced, the V-T characteristic was measured, which is not illustrated. In both cases of the alloy films overcoating, R(+)=R(−) was observed and neither battery effect nor asymmetry in both polarities of the reflectances R(+) and R(−) was observed. And no offset voltage was observed.

Figure 13:
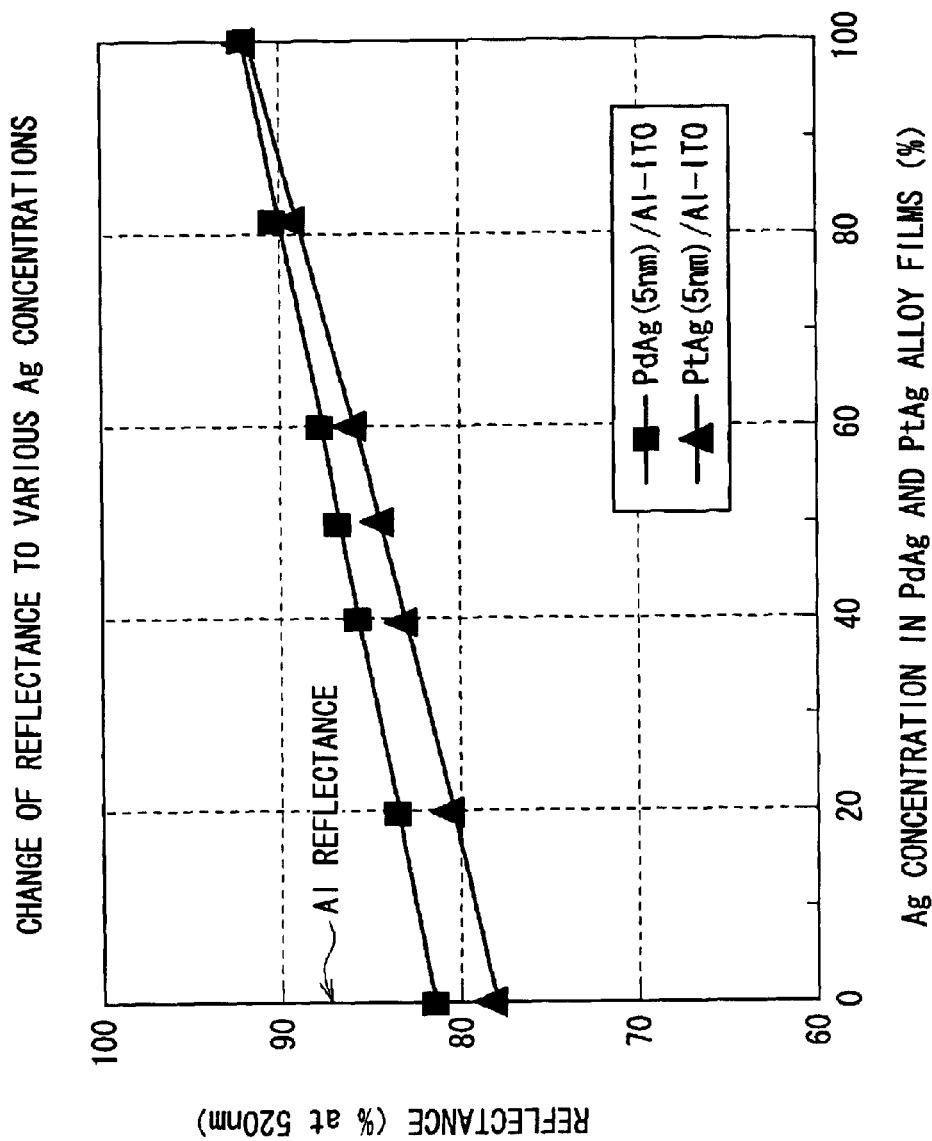
FIG. 13 is a characteristic view showing reflectance changes when using the palladium-silver alloy film and a platinum-silver alloy film with various mixing concentrations of silver for overcoating.

Next, change of the reflectance was measured when they were overcoated with an alloy film (5 nm) of a palladium-silver alloy film or a platinum-silver alloy film with various mixture concentrations of silver. FIG. 13 shows the measurement results, the vertical axis represents reflectance (%), and the horizontal axis represents the mixture concentrations of silver in each alloy.

When they were overcoated with only the silver film (a sample with the silver mixture concentration of 100% in the figure), the reflectance was increased more than that of the original aluminum pixel electrode. However, generally, a silver elemental substance film needs an ultraviolet ozone cleaning treatment in liquid crystal processes. The treatment blackens surfaces thereof, and irradiation of strong light causes discoloration, so it is important to be careful in using it. On the other hand, the overcoating of only palladium or platinum (samples with the silver mixture concentration of 0% in the figure), decreased the reflectance.

These examples have exhibited that the alloy films of palladium-silver and platinum-silver are effective as a procedure of solving both of the problems of the chemical instability of silver and the low reflectances of palladium and platinum. That is, the chemical instability of silver is eliminated by mixing palladium or platinum which is chemically very stable. Moreover, the reflectance, which is low due to the overcoating of palladium or platinum, is increased even to a value equivalent to that of the original aluminum pixel electrode by mixing silver therewith. The mixing ratio which satisfies both characteristics of the chemical stability and the reflectance (silver mixture concentration) was an atomic ratio of 20% to 80%, and preferably 40% to 60%.

Example 3

Comparison Based on Thicknesses

Next, the V-T characteristic when using the metal film 43 with various thicknesses for overcoating was examined. Production of devices for evaluation and measurement conditions are the same as those of Example 1. Silver, palladium, and platinum were used as the material of the metal film 43. The cases where the thickness of silver, palladium, and platinum is set to 2 nm, 5 nm, and 20 nm were measured.

FIG. 14 shows the measurement results thereof, that is, the relation (an asymmetric situation) between the reflectances R(+) and R(−) and the offset voltage in each of the materials and the thickness. Also, FIG. 14 shows the characteristics when not using the metal film 43 (that is, only the aluminum electrode) for overcoating, and when using the palladium-silver alloy film and the platinum-silver alloy film like Example 2, as well as silver, palladium, and platinum for overcoating.

As can be seen from the results in FIG. 14, the overcoating of the metal film 43 which is made of each material with each thickness reduces the asymmetry and the offset voltage, unlike the case of using only aluminum as the electrode material.

Here, it was confirmed that the metal film 43 of 1 nm or more in thickness, which overcoated the aluminum pixel electrodes, was sufficiently effective for preventing the asymmetry, which is not illustrated. The thickness less than 1 nm is considered to be also effective for preventing the asymmetry, but it is difficult to uniformly form such a thin film. On the other hand, the metal film 43 of 100 nm or more in thickness for overcoating is too thick to transmit light, and to exhibit the original absolute reflectance of the reflective electrode (the pixel electrodes 42A). Therefore, the thickness of the metal film for overcoating is appropriately not less than 1 nm and below 100 nm.

Example 4

Spectral Characteristic

Figure 15:
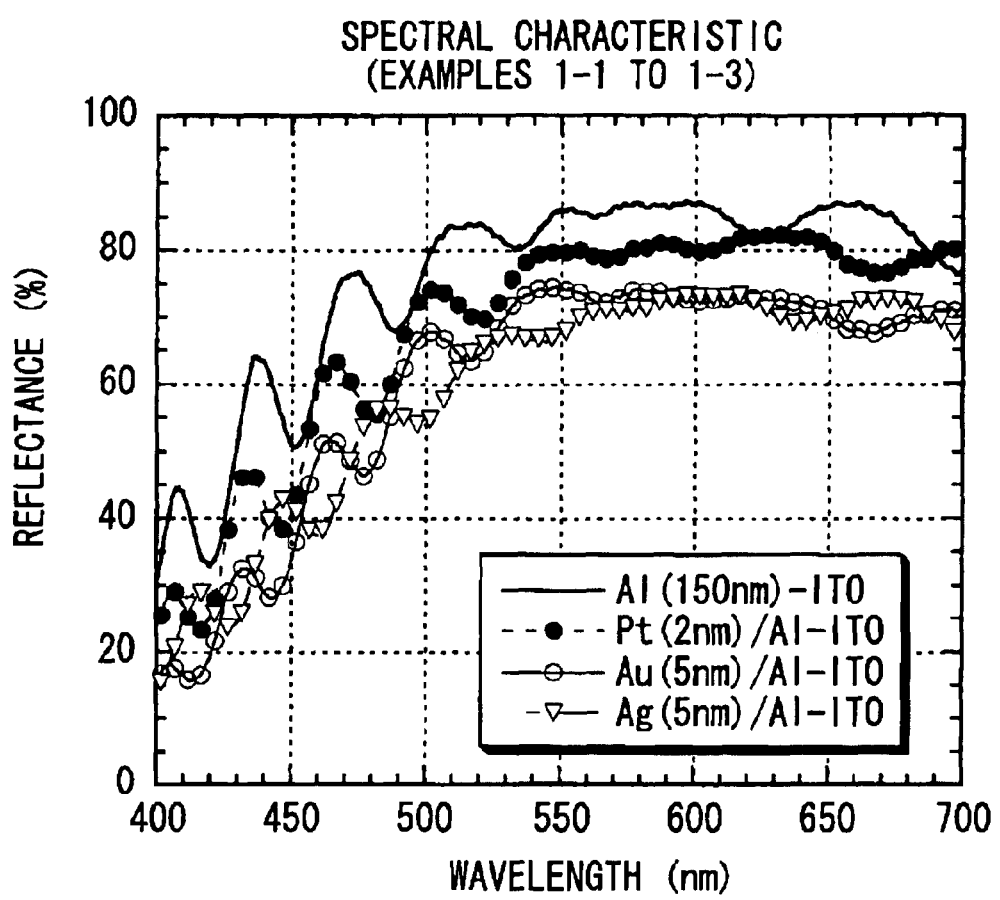
FIG. 15 is a characteristic view showing spectral properties of reflectance when platinum, gold, and silver are used as the metal film.

A spectral characteristic of the reflectance when applying a 60 Hz square wave as the driving voltage to the devices having the platinum, gold, and silver overcoatings produced in Examples 1-1 to 1-3 was measured (FIG. 15). The measurements were performed with the intensified multi-channel spectrophotometer IMUC7000 manufactured by Otsuka Electronics Co., Ltd. like Comparative Examples (FIG. 6). In FIG. 15, the horizontal axis represents wavelength (nm) and the vertical axis represents reflectance (%). In the figure, a plotted curve with black circles represents the measurement results when using platinum (2 nm in thickness) as the metal film 43 for overcoating, and plotted curves with circles and inverted triangles represent the measurement results respectively when using gold (5 nm in thickness), and silver (5 nm in thickness) for overcoating. Moreover, a solid line with no plotting point represents the measurement results when not using the metal film 43 (the case of the only aluminum electrode) for overcoating as a reference.

Figure 16:
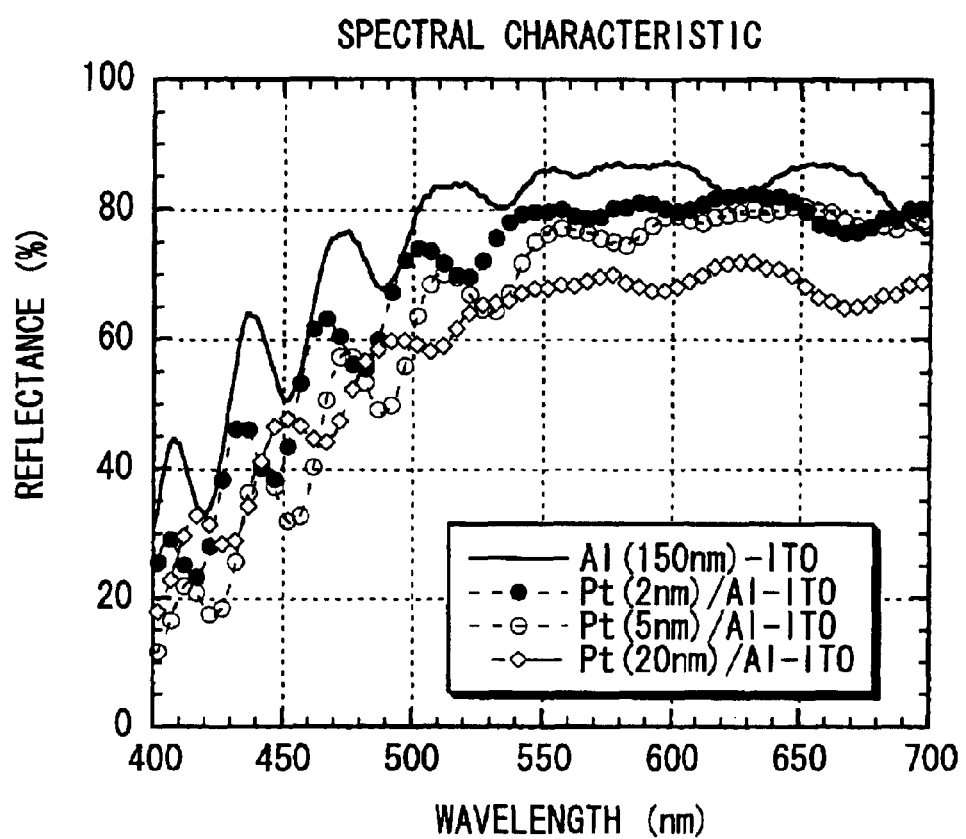
FIG. 16 is a characteristic view showing the spectral properties when platinum with various thicknesses is used as the metal film.

Moreover, as shown in FIG. 16, the spectral characteristic of the reflectance of platinum with various thicknesses was measured. Measurement conditions were the same as those of the spectral characteristic shown in FIG. 15. In the figure, a plotted curve with black circles represents the measurement results when using platinum with a thickness of 2 nm, and plotted curves with circles and rhombus represent the measurement results respectively when using one with a thickness of 5 nm, and a thickness of 20 nm. Moreover, a solid line with no plotting point represents the measurement results when not using the metal film 43 (the case of the only aluminum electrode) for overcoating as a reference.

As can be seen from these results, in each material and each thickness, the good spectral characteristic, which is sufficient for practical use, was obtained in the full wavelength region.

The invention is not limited to the embodiment but can be variously modified. For example, the reflective liquid crystal display device of the invention can be widely applied not only to the LCD projectors but also to other display apparatuses and image display in various portable electric devices and in various information processing terminals, and the like.

As described above, according to the reflective liquid crystal display device and the liquid crystal display of the invention, the surface of the pixel electrode facing the transparent electrode is covered with the metal film, which has the standard electrode potential with the sign opposite to that of the metallic material constituting the pixel electrode, so the battery effect between the opposing electrodes can be prevented. Thereby, the asymmetry of the liquid crystal responses can be prevented, which accomplishes the reduction of the offset voltage which is applied to the driving voltage. Therefore, applying the offset voltage becomes unnecessary, or the change of the offset voltage can be decreased even during the long term driving, and as a result, high reliability can be secured even during the long term driving.

Obviously many modifications and variations of the present invention are possible in the light of the above teachings. It is therefore to be understood that within the scope of the appended claims the invention may be practiced otherwise than as specifically described.

What is claimed is:

1. A reflective liquid crystal display device comprising:
a pixel electrode substrate that has a reflective pixel electrode made of a metallic material formed thereon;
an opposite substrate that has a transparent electrode formed thereon being located to face the pixel electrode;
a liquid crystal that fills a gap between the pixel electrode substrate and the opposite substrate; and
a metal film covering a surface of the pixel electrode facing the transparent electrode, wherein the metal film is made of a material different from a material of the pixel electrode, the material of the metal film having a standard electrode potential with a sign opposite to a sign of the material of the pixel electrode and wherein the standard electrode potential of the metal film is substantially equal to a standard electrode potential of the transparent electrode.

2. The reflective liquid crystal display device according to claim 1, wherein a principal component of the pixel electrode is aluminum.

3. The reflective liquid crystal display device according to claim 2, wherein a principal component of the metal film is one of platinum, silver, gold, palladium, iridium, and any alloy thereof.

4. The reflective liquid crystal display device according to claim 2, wherein a principal component of the metal film is one of a silver-palladium alloy and a silver-platinum alloy.

5. The reflective liquid crystal display device according to claim 4, wherein a mixture ratio of the silver in the silver-palladium alloy and the silver-platinum alloy is 20% to 80% in atomic percentage.

6. The reflective liquid crystal display device according to claim 1, wherein the transparent electrode is made of an indium tin oxide (ITO) film.

7. The reflective liquid crystal display device according to claim 1, wherein a thickness of the metal film is between 1 nm and 100 nm.

8. The reflective liquid crystal display device according to claim 1, wherein the pixel electrode is driven by a switching element provided on a silicon substrate.

9. The reflective liquid crystal display device according to claim 1, wherein the liquid crystal is a vertically aligned liquid crystal.

10. A liquid crystal display having a reflective liquid crystal display device for displaying images by using light that is modulated by the reflective liquid crystal display device,
wherein the reflective liquid crystal display device comprises:
a pixel electrode substrate that, has a reflective pixel electrode made of a metallic material formed thereon;
an opposite substrate that has a transparent electrode formed thereon and being located to face the pixel electrode;
a liquid crystal that fills a gap between the pixel electrode substrate and the opposite substrate; and
a metal surface film covering a surface of the pixel electrode facing the transparent electrode, wherein the metal film is made of a material different from a material of the pixel electrode, the material of the metal film having a standard electrode potential with a sign opposite to a sign of the material of the pixel electrode and wherein the standard electrode potential of the metal film is substantially equal to a standard electrode potential of the transparent electrode.

11. The liquid crystal display according to claim 10, further comprising:
a light source; and
projection means for projecting light that is emitted from the light source and modulated by the reflective liquid crystal display device on a screen,
and constituting a reflective liquid crystal projector.

* * * * *